United States Patent
Wu et al.

(10) Patent No.: US 11,809,025 B2
(45) Date of Patent: *Nov. 7, 2023

(54) ANTI-BLUE-RAY UV OPTICAL LENS DEVICE WITH CHROMA ENHANCEMENT

(71) Applicants: Tien-Shu Wu, Tainan (TW); Yen-Ting Wu, Tainan (TW); Ho-Lun Chen, Tainan (TW)

(72) Inventors: Tien-Shu Wu, Tainan (TW); Yen-Ting Wu, Tainan (TW); Ho-Lun Chen, Tainan (TW)

(73) Assignee: FORESIGHT OPTICAL LTD., Tainan (TW)

( * ) Notice: Subject to any disclaimer, the term of this patent is extended or adjusted under 35 U.S.C. 154(b) by 96 days.

This patent is subject to a terminal disclaimer.

(21) Appl. No.: 17/345,942

(22) Filed: Jun. 11, 2021

(65) Prior Publication Data

US 2022/0260857 A1 Aug. 18, 2022

Related U.S. Application Data

(60) Provisional application No. 63/150,553, filed on Feb. 17, 2021.

(51) Int. Cl.
*G02C 7/10* (2006.01)
*G02C 7/02* (2006.01)
*G02C 7/12* (2006.01)

(52) U.S. Cl.
CPC ............ *G02C 7/104* (2013.01); *G02C 7/02* (2013.01); *G02C 7/12* (2013.01)

(58) Field of Classification Search
CPC ........ G02C 7/10; G02C 7/104; G02C 7/022; B29D 11/00548; G02B 1/115
USPC ........................................... 351/159
See application file for complete search history.

(56) References Cited

U.S. PATENT DOCUMENTS

| | | | | |
|---|---|---|---|---|
| 2004/0125337 A1* | 7/2004 | Boulineau | ............... | G02C 7/12 351/159.62 |
| 2012/0075577 A1* | 3/2012 | Ishak | ...................... | G02C 7/10 351/159.6 |
| 2015/0098057 A1* | 4/2015 | Qin | ...................... | C08G 18/10 351/159.61 |
| 2017/0235160 A1* | 8/2017 | Larson | ................... | G02C 7/104 351/45 |
| 2020/0285078 A1* | 9/2020 | Martins | .................. | G02C 7/108 |
| 2020/0363659 A1* | 11/2020 | Ambler | .................. | G02C 7/102 |
| 2021/0080753 A1* | 3/2021 | Hsu | ......................... | G02C 7/12 |

* cited by examiner

*Primary Examiner* — Darryl J Collins
*Assistant Examiner* — Matthew Y Lee
(74) *Attorney, Agent, or Firm* — Che-Yang Chen; Law Office of Michael Chen (57) ABSTRACT

An optical lens device includes a lens body, an optical filter and an optical absorbance portion. The lens body has a first lens surface and a second lens surface between which to form the optical filter where is to provide the optical absorbance portion. The optical absorbance portion includes a main absorbance area having an absorbance peak portion. The main absorbance area has a first wavelength range between 420 nm and 440 nm formed as a high-energy blue UV absorbance area.

20 Claims, 8 Drawing Sheets

ANTI-BLUE-RAY UV OPTICAL LENS DEVICE WITH CHROMA ENHANCEMENT

CROSS REFERENCE TO RELATED APPLICATIONS

This application claims priority to and the benefit of U.S. provisional patent application Ser. No. 63/150,553, filed Feb. 17, 2021, which is hereby incorporated by reference in its entirety.

BACKGROUND OF THE INVENTION

1. Field of the Invention

The present invention relates to an anti-blue-ray UV optical lens device with chroma enhancement. Particularly, the present invention relates to the anti-blue-ray UV optical lens device with chroma enhancement for eyewear or wearable eye protection. More particularly, the present invention relates to the anti-blue-ray UV optical lens device with chroma enhancement for protecting high-energy rays.

2. Description of the Related Art

U.S. Pat. No. 9,134,547, entitled "EYEWARE WITH CHROMA ENHANCEMENT," discloses eyeware including a lens body and an optical filter configured to attenuate visible light in certain spectral bands. The optical filter has a spectral profile including a plurality of absorptance peaks. Each of the absorptance peaks has a maximum absorptance, a center wavelength and an absorptance peak location. The absorptance peaks include a blue absorbance peak having a spectral range between 445 nm and 480 nm or 445 nm and 485 nm, a yellow absorbance peak having a spectral range between 540 nm and 600 nm or 572 nm and 576 nm and a red absorbance peak having a spectral range between 610 nm and 660 nm.

Further, U.S. Pat. No. 9,383,594, entitled "EYEWARE WITH CHROMA ENHANCEMENT," discloses eyeware including a lens body and an optical filter configured to attenuate visible light in certain spectral bands. The lens body has a gray appearance having a first filtered portion of visible spectrum comprising a spectral range of about 440 nm to about 510 nm, a second filtered portion of visible spectrum comprising a spectral range of about 540 nm to about 600 nm, and a third filtered portion of visible spectrum comprising a spectral range of about 630 nm to about 660 nm.

Further, U.S. Pat. No. 9,575,335, entitled "EYEWARE WITH CHROMA ENHANCEMENT FOR SPECIFIC ACTIVITIES," discloses eyeware including a lens body and an optical filter configured to attenuate visible light in a first spectral band and a second spectral band. The first spectral band comprises a first absorbance peak having a first center wavelength in a wavelength range between about 450 nm and about 490 nm, or about 440 nm and about 510 nm. The second spectral band comprises a second absorbance peak having a second center wavelength in a wavelength range between about 550 nm and about 590 nm, about 555 nm and about 580 nm, or about 550 nm and about 570 nm.

Further, U.S. Pat. No. 9,910,297, entitled "EYEWARE WITH CHROMA ENHANCEMENT," discloses eyeware including a lens body and an optical filter configured to attenuate visible light in a first spectral band and a second spectral band. The first spectral band comprises a first absorbance peak between about 440 nm and about 510 nm and a first maximum absorptance between about 440 nm and about 510 nm. The second spectral band comprises a second absorbance peak between about 550 nm and about 590 nm and a second maximum absorptance between about 540 nm and about 600 nm.

Further, U.S. Pat. No. 8,770,749, entitled "EYEWARE WITH CHROMA ENHANCEMENT," discloses eyeware including a lens body and an optical filter configured to attenuate visible light in a plurality of spectral bands. Each of spectral bands includes an absorptance peak with a spectral bandwidth, a maximum absorptance and an integrated absorptance peak area within the spectral bandwidth. The optical filter comprises a blue light absorptance peak with a center wavelength between about 445 nm and about 480 nm and a yellow light absorptance peak with a center wavelength between about 540 nm and about 580 nm. A first optical filter comprises a first spectral band between about 440 nm and about 480 nm and a second optical filter comprises a second spectral band between about 630 nm and about 660 nm.

Further, U.S. Pat. No. 10,401,652, entitled "EYEWARE WITH CHROMA ENHANCEMENT," discloses eyeware including a lens body and an optical filter configured to attenuate visible light in a plurality of spectral bands. A first optical filter comprises a first spectral band between about 440 nm and about 480 nm, a second optical filter comprises a second spectral band between about 540 nm and about 600 nm and a third optical filter comprises a third spectral band between about 630 nm and about 660 nm. The optical filter comprises a blue light absorptance peak with a center wavelength between about 440 nm and about 510 nm, a yellow light absorptance peak with a center wavelength between about 540 nm and about 600 nm and a red light absorptance peak with a center wavelength between about 610 nm and about 660 nm.

Further, U.S. Pat. No. 10,345,623, entitled "EYEWARE WITH CHROMA ENHANCEMENT," discloses eyeware including a lens body and an optical filter configured to attenuate visible light in certain spectral bands. Each of spectral bands includes an absorptance peak with a spectral bandwidth, a maximum absorptance and an integrated absorptance peak area within the spectral bandwidth. The optical filter comprises a first absorptance peak, a second absorptance peak and a third absorptance peak. A first maximum absorptance of the first absorptance peak is However, there is a need of improving the conventional eyeware devices for enhancing color vision and spatial visibility and further increasing eye comfortability and eye protection. The above-mentioned patent application publications are incorporated herein by reference for purposes including, but not limited to, indicating the background of the present invention and illustrating the situation of the art.

SUMMARY OF THE INVENTION

The primary objective of this invention is to provide an anti-blue-ray UV optical lens device with chroma enhancement. The optical lens device includes a lens body and an optical filter provided therein. The lens body has an optical absorbance portion, including at least one main absorbance area having at least one absorbance peak portion. The main absorbance area has a wavelength range between 420 nm and 440 nm as a high-energy blue UV absorbance area. Advantageously, the optical lens device of the present invention is successful in enhancing color vision and spatial visibility and further increasing eye comfortability and eye protection.

The optical lens device in accordance with an aspect of the present invention includes:

a lens body having a first lens surface and a second lens surface, with the first lens surface provided at a first side of the lens body, with the second lens surface provided at a second side of the lens body;

an optical filter provided between the first side and the second side of the lens body; and an optical absorbance portion provided in the optical filter, with the optical absorbance portion having at least one main absorbance area with at least one absorbance peak portion;

wherein the main absorbance area has a first wavelength range between 420 nm and 440 nm formed as a high-energy blue UV absorbance area.

The optical lens device in accordance with another aspect of the present invention includes:

a lens body having a first lens surface and a second lens surface, with the first lens surface provided at a first side of the lens body, with the second lens surface provided at a second side of the lens body;

an optical filter provided between the first side and the second side of the lens body; and an optical absorbance portion provided in the optical filter, with the optical absorbance portion having at least one main absorbance area with at least one absorbance peak portion;

wherein the main absorbance area has a second wavelength range between 425 nm and 435 nm formed as a high-energy blue UV absorbance area.

In a separate aspect of the present invention, the absorbance peak portion of the main absorbance area has a spectral range with an absorbance above 50%, 60%, 70%, 80% or 95%.

In a further separate aspect of the present invention, the at least one absorbance peak portion of the main absorbance area has an included angle defined by a first line having a first slope of absorbance/wavelength and a second line having a second slope of absorbance/wavelength.

In yet a further separate aspect of the present invention, the included angle is about 60°.

In yet a further separate aspect of the present invention, the main absorbance area has a maximum absorbance with a wavelength about 432 nm.

In yet a further separate aspect of the present invention, the absorbance peak portion of the main absorbance area ranges at the maximum absorbance of 432 nm.

In yet a further separate aspect of the present invention, the main absorbance area is corresponding with another main absorbance area.

In yet a further separate aspect of the present invention, the absorbance peak portion of the main absorbance area ranges between 420 nm and 440 nm or any suitable range within 420 nm and 440 nm.

In yet a further separate aspect of the present invention, the absorbance peak portion of the main absorbance area ranges between 425 nm and 435 nm or any suitable range within 425 nm and 435 nm.

Further scope of the applicability of the present invention will become apparent from the detailed description given hereinafter. However, it should be understood that the detailed description and specific examples, while indicating preferred embodiments of the invention, are given by way of illustration only, since various will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that an optical lens device with chroma enhancement in accordance with the preferred embodiment of the present invention can be applicable to various glasses (including rimless glasses), various sunglasses, various smart glasses, various sport glasses (including motorcycle-riding glasses), various goggles, various VR wearable glasses devices, various AR wearable glasses devices or other optical devices such as computer display glasses or TV screen glasses, which are not limitative of the present invention.

Figure 1:
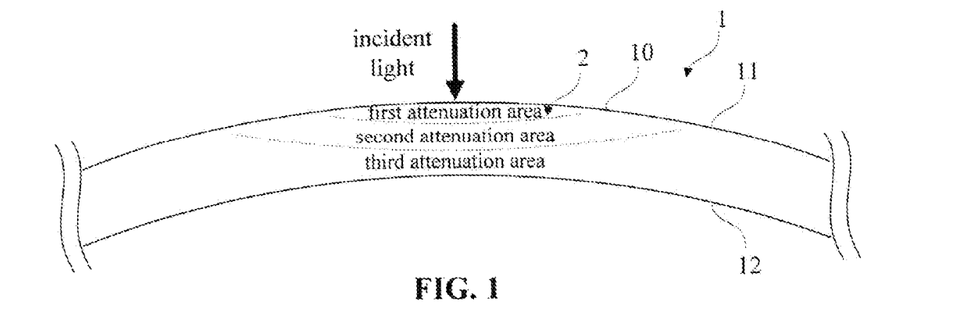
FIG. 1 is a schematic side view of an anti-blue-ray UV optical lens device with chroma enhancement in accordance with a first preferred embodiment of the present invention.

FIG. 1 shows a schematic side view of an anti-blue-ray UV optical lens device with chroma enhancement in accordance with a first preferred embodiment of the present invention. Referring now to FIG. 1, the anti-blue-ray UV optical lens device with chroma enhancement in accordance with the first preferred embodiment of the present invention includes a first lens body 1, an optical filter 10 and an optical absorbance portion 2.

With continued reference to FIG. 1, by way of example, the first lens body 1 is formed from a curved-surface lens body such as a corrective glasses, a sunglasses, a sport glasses, a reading glasses, a helmet face shield, a safety helmet face shield (including welding helmet face shield), or other curved-surface lens bodies. The first lens body 1 is a transparent lens body with a preferred curvature.

Still referring to FIG. 1, by way of example, the first lens body 1 has a first lens surface 11 located at a first side (i.e. outer side as a light incident side) and a second lens surface 12 located at a second side (i.e. inner side as a light filtered side). The first lens body 1 is serially formed with a first light-attenuation layer (or area) with at least one first predetermined absorbance peak, a second light-attenuation layer (or area) with at least one second predetermined absorbance peak and a third light-attenuation layer (or area) with at least one third predetermined absorbance peak.

Figure 2:
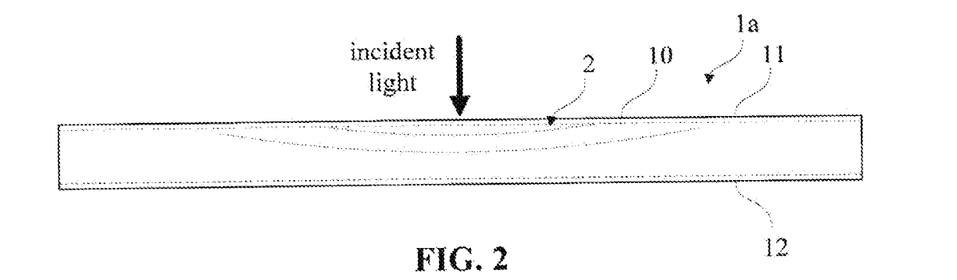
FIG. 2 is a schematic side view of an anti-blue-ray UV optical lens device with chroma enhancement in accordance with a second preferred embodiment of the present invention.

FIG. 2 shows a schematic side view of an optical lens device with chroma enhancement in accordance with a second preferred embodiment of the present invention, corresponding to that shown in FIG. 1. Turning now to FIG. 2, in comparison with the first embodiment, the anti-blue-ray UV optical lens device with chroma enhancement in accordance with the second preferred embodiment of the present invention includes a second lens body 1a, an optical filter 10 and an optical absorbance portion 2.

With continued reference to FIG. 2, by way of example, the second lens body 1a is formed from a flat-surface lens body, a thin layer lens body or a multiple layer lens body such as a TV screen glasses, a screen protector for 3C electronic devices, or other flat-surface lens bodies.

Referring back to FIGS. 1 and 2, by way of example, the optical filter 10 is suitably provided between the first lens surface 11 and the second lens surface 12 of the first lens body 1 or the second lens body 1a. Accordingly, the optical filter 10 is capable of attenuating incident light from the first lens surface 11 to the second lens surface 12, as best shown by arrows in FIGS. 1 and 2.

Still referring to FIGS. 1 and 2, by way of example, the optical absorbance portion 2 is suitably provided at a preferred position of the optical filter 10. In a preferred embodiment, the optical absorbance portion 2 may be at the first lens surface 11 or the second lens surface 12. The optical absorbance portion 2 includes a plurality of main absorbance areas and is made from at least one dye powder material which is selected from FOB-002 manufactured by Yamada Chemical Co. Ltd., Japan (region $\lambda_{Max}$=432 nm), FOG-007 manufactured by Yamada Chemical Co. Ltd., Japan (region $\lambda_{Max}$=595 nm) or a mixture thereof.

With continued reference to FIGS. 1 and 2, by way of example, the optical absorbance portion 2 has a plurality of main absorbance areas to filter incident light, as best shown by arrows in FIGS. 1 and 2, to form a filtered spectrum band. Furthermore, the optical absorbance portion 2 is formed from a plurality of attenuation areas, as best shown by curved dotted lines in FIGS. 1 and 2, which are selectively made from different concentrations of dye powder materials.

Figure 3:
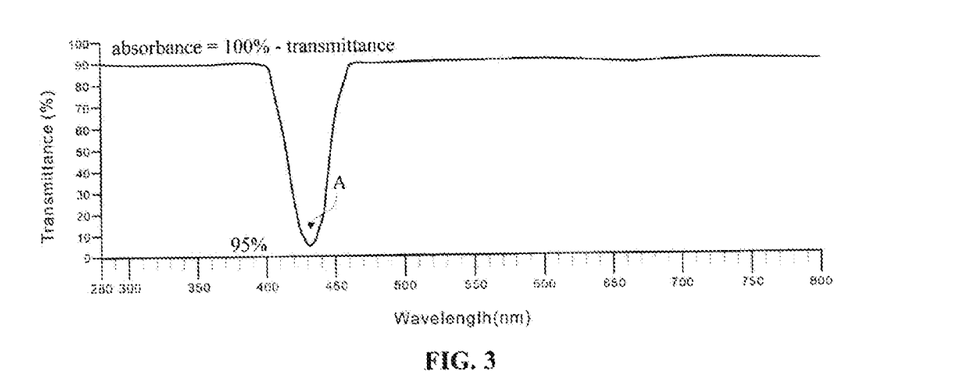
FIG. 3 is a chart illustrating a first filtered spectral band of the anti-blue-ray UV optical lens device in accordance with a preferred embodiment of the present invention.

FIG. 3 shows a chart illustrating a first filtered spectral band of the anti-blue-ray UV optical lens device in accordance with a preferred embodiment of the present invention. Turning now to FIGS. 1, 2 and 3, by way of example, the first filtered spectral band through the optical absorbance portion 2 has a main absorbance area "A", as best shown at left side in FIG. 3, which are made from a preferred concentration of FOB-002. In a preferred embodiment, the preferred concentration of FOB-002 is between about 0.005 g/kg PC and about 0.02 g/kg PC or is about 0.015 g/kg PC for a peak (e.g. $\lambda_{Max}$=432 nm).

With continued reference to FIGS. 1, 2 and 3, by way of example, the main absorbance area "A" has an absorbance peak portion. Furthermore, the first main absorbance area "A" has a wavelength range between 420 nm and 440 nm formed as a high-energy blue UV absorbance area. In another preferred embodiment, the main absorbance area "A" has a wavelength range between 425 nm and 435 nm.

With continued reference to FIG. 3, in another preferred embodiment, the absorbance peak portion of the main absorbance area "A" has a first wavelength ranging between 420 nm and 440 nm, or between 425 nm and 435 nm. The first absorbance peak portion of the main absorbance area "A" has an absorbance above 95%.

Figure 4:
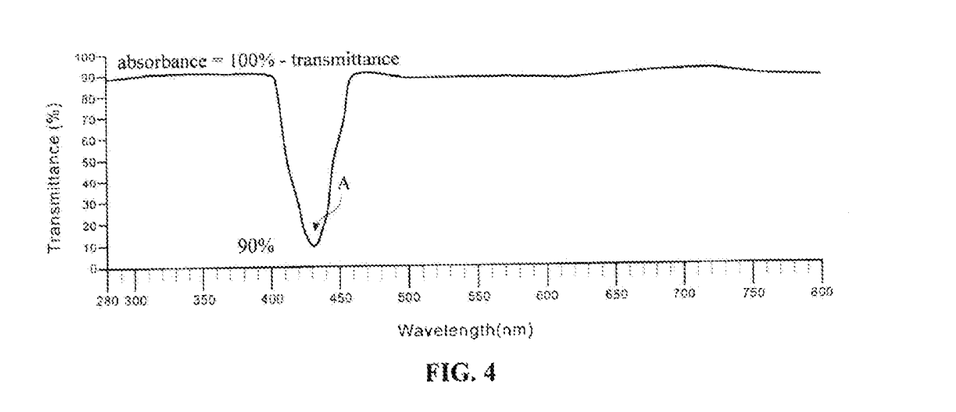
FIG. 4 is a chart illustrating a second filtered spectral band of the anti-blue-ray UV optical lens device in accordance with another preferred embodiment of the present invention.

FIG. 4 shows a chart illustrating a second filtered spectral band of the anti-blue-ray UV optical lens device in accordance with another preferred embodiment of the present invention. Turning now to FIGS. 1, 2 and 4, by way of example, the sixth filtered spectral band through the optical absorbance portion 2 has a main absorbance area "A", as best shown at left side in FIG. 4. Furthermore, the absorbance peak portion of the main absorbance area "A" has an absorbance above 90%.

Figure 5:
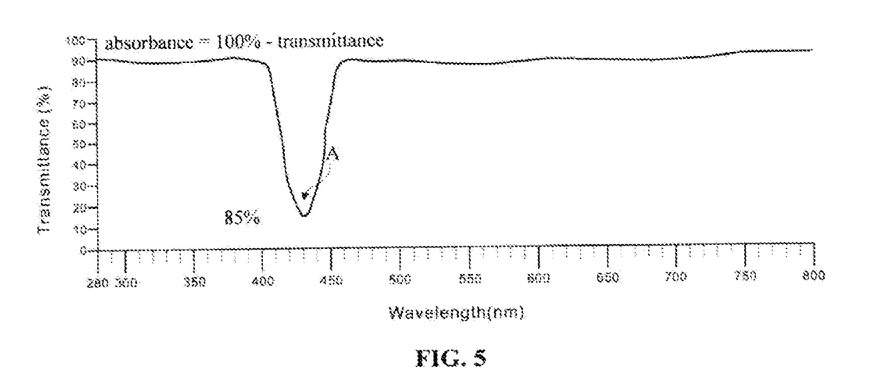
FIG. 5 is a chart illustrating a third filtered spectral band of the anti-blue-ray UV optical lens device in accordance with another preferred embodiment of the present invention.

FIG. 5 shows a chart illustrating a third filtered spectral band of the anti-blue-ray UV optical lens device in accordance with another preferred embodiment of the present invention. Turning now to FIGS. 1, 2 and 5, by way of example, the sixth filtered spectral band through the optical absorbance portion 2 has a main absorbance area "A", as best shown at left side in FIG. 5. Furthermore, the absorbance peak portion of the main absorbance area "A" has an absorbance above 85%.

Figure 6:
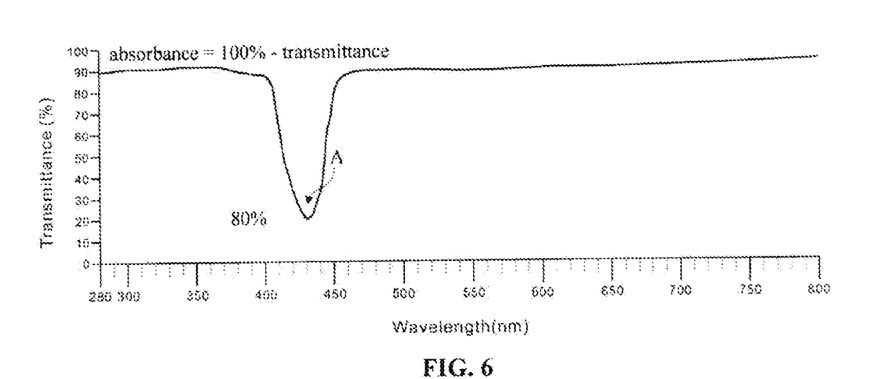
FIG. 6 is a chart illustrating a fourth filtered spectral band of the anti-blue-ray UV optical lens device in accordance with another preferred embodiment of the present invention.

FIG. 6 shows a chart illustrating a fourth filtered spectral band of the anti-blue-ray UV optical lens device in accordance with another preferred embodiment of the present invention. Turning now to FIGS. 1, 2 and 6, by way of example, the sixth filtered spectral band through the optical absorbance portion 2 has a main absorbance area "A", as best shown at left side in FIG. 6. Furthermore, the absorbance peak portion of the main absorbance area "A" has an absorbance above 80%.

Figure 7:
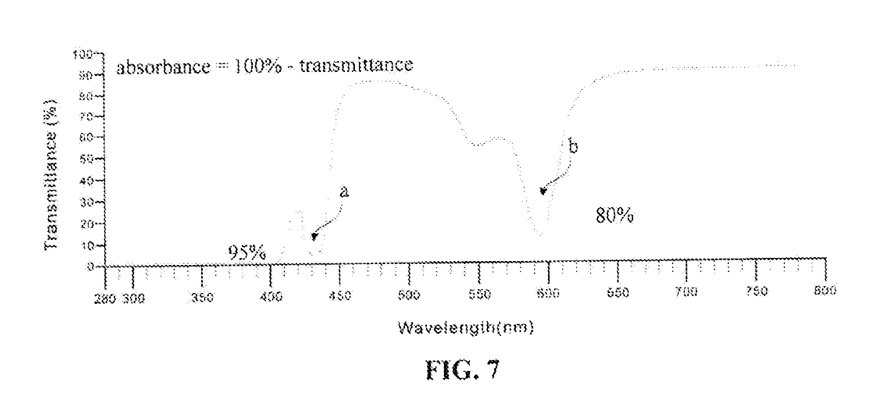
FIG. 7 is a chart illustrating a fifth filtered spectral band of the anti-blue-ray UV optical lens device in accordance with another preferred embodiment of the present invention.

FIG. 7 shows a chart illustrating a fifth filtered spectral band of the anti-blue-ray UV optical lens device in accordance with a preferred embodiment of the present invention. Turning now to FIGS. 1, 2 and 7, by way of example, the fifth filtered spectral band through the optical absorbance portion 2 has a first main absorbance area "a", as best shown at left side in FIG. 7, and a second main absorbance area "b", as best shown at right side in FIG. 7, which are made from a first preferred concentration of FOB-002 and a second preferred concentration of FOB-007. In a preferred embodiment, the first preferred concentration of FOB-002 is between about 0.005 g/kg PC and about 0.02 g/kg PC or is about 0.015 g/kg PC for a first peak (e.g. $\lambda_{Max}$=432 nm) while the second preferred concentration of FOB-007 is between about 0.005 g/kg PC and about 0.04 g/kg PC or is about 0.03 g/kg PC for a second peak (e.g. $\lambda_{Max}$=595 nm).

With continued reference to FIGS. 1, 2 and 7, by way of example, the first main absorbance area "a" has a first absorbance peak portion and the second main absorbance area "b" has a second absorbance peak portion. Furthermore, the first main absorbance area "a" has a first wavelength range between 420 nm and 440 nm formed as a high-energy blue UV absorbance area while the second main absorbance area "b" has a second wavelength range between 580 nm and 610 nm.

Referring again to FIG. 7, in another preferred embodiment, the first main absorbance area "a" has a first wavelength range between 420 nm and 440 nm while the second absorbance peak portion of the second main absorbance area "b" has a second wavelength ranging between 580 nm and 610 nm.

With continued reference to FIG. 7, in another preferred embodiment, the first absorbance peak portion of the first main absorbance area "a" has a first wavelength ranging between 420 nm and 440 nm, or between 425 nm and 435 nm while the second main absorbance area "b" has a second wavelength range between 580 nm and 610 nm, between 590 nm and 605 nm, or between 590 nm and 600 nm.

With continued reference to FIG. 7, by way of example, the first absorbance peak portion of the first main absorbance area "a" has a first absorbance above 95% and the second absorbance peak portion of the second main absorbance area "b" has a second absorbance above 80% or 85%. A predetermined ratio of first absorbance to second absorbance is 95:80, 95:85 or other suitable value, as best shown in FIGS. 7-18.

Figure 8:
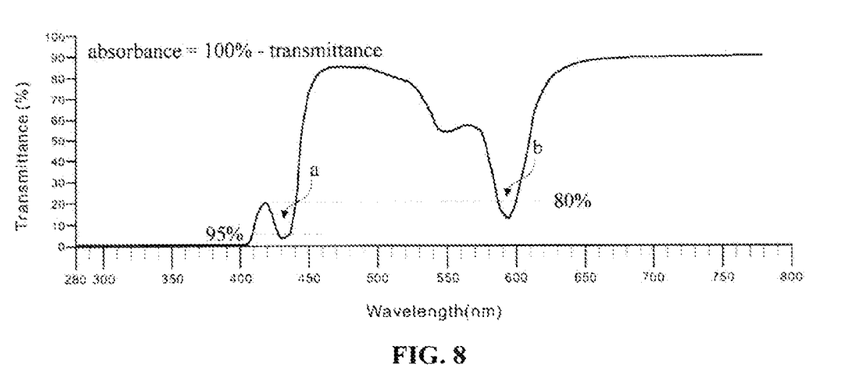
FIG. 8 is a chart illustrating a sixth filtered spectral band of the anti-blue-ray UV optical lens device in accordance with another preferred embodiment of the present invention.

FIG. 8 shows a chart illustrating a sixth filtered spectral band of the anti-blue-ray UV optical lens device in accordance with another preferred embodiment of the present invention. Turning now to FIGS. 1, 2 and 8, by way of example, the sixth filtered spectral band through the optical absorbance portion 2 has a first main absorbance area "a", as best shown at left side in FIG. 8, and a second main absorbance area "b", as best shown at right side in FIG. 8. Furthermore, the first absorbance peak portion of the first main absorbance area "a" has a first absorbance above 95% and the second absorbance peak portion of the second main absorbance area "b" has a second absorbance above 80%.

Figure 9:
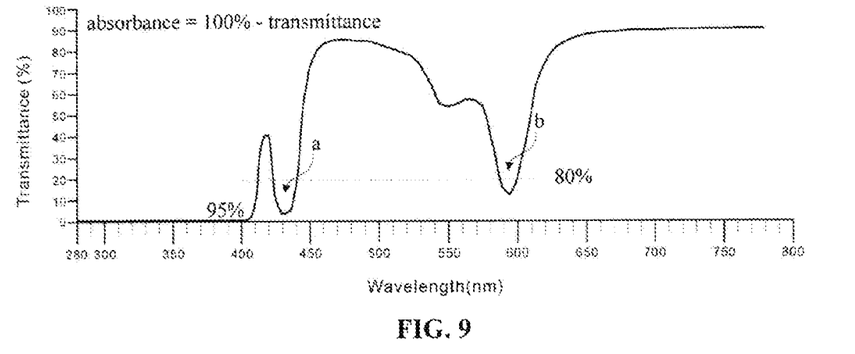
FIG. 9 is a chart illustrating a seventh filtered spectral band of the anti-blue-ray UV optical lens device in accordance with another preferred embodiment of the present invention.

FIG. 9 shows a chart illustrating a seventh filtered spectral band of the anti-blue-ray UV optical lens device in accordance with another preferred embodiment of the present invention. Turning now to FIGS. 1, 2 and 9, by way of example, the seventh filtered spectral band through the optical absorbance portion 2 has a first main absorbance area "a", as best shown at left side in FIG. 9, and a second main absorbance area "b", as best shown at right side in FIG. 9. Furthermore, the first absorbance peak portion of the first main absorbance area "a" has a first absorbance above 95% and the second absorbance peak portion of the second main absorbance area "b" has a second absorbance above 80%.

Figure 10:
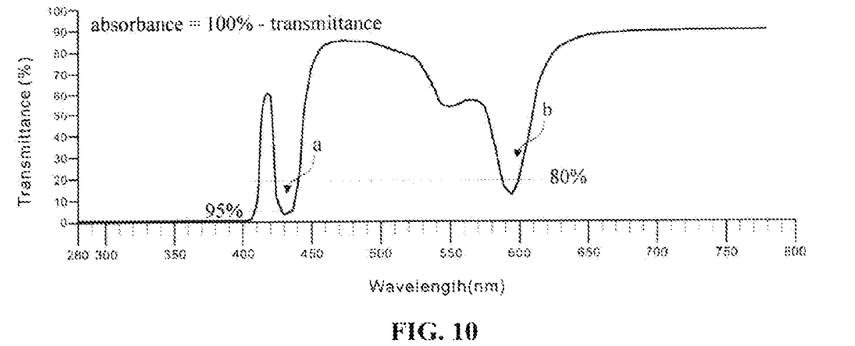
FIG. 10 is a chart illustrating an eighth filtered spectral band of the anti-blue-ray UV optical lens device in accordance with another preferred embodiment of the present invention.

FIG. 10 shows a chart illustrating an eighth filtered spectral band of the anti-blue-ray UV optical lens device in accordance with another preferred embodiment of the present invention. Turning now to FIGS. 1, 2 and 10, by way of example, the eighth filtered spectral band through the optical absorbance portion 2 has a first main absorbance area "a", as best shown at left side in FIG. 10, and a second main absorbance area "b", as best shown at right side in FIG. 10. Furthermore, the first absorbance peak portion of the first main absorbance area "a" has a first absorbance above 95% and the second absorbance peak portion of the second main absorbance area "b" has a second absorbance above 80%.

Figures 11, 12:
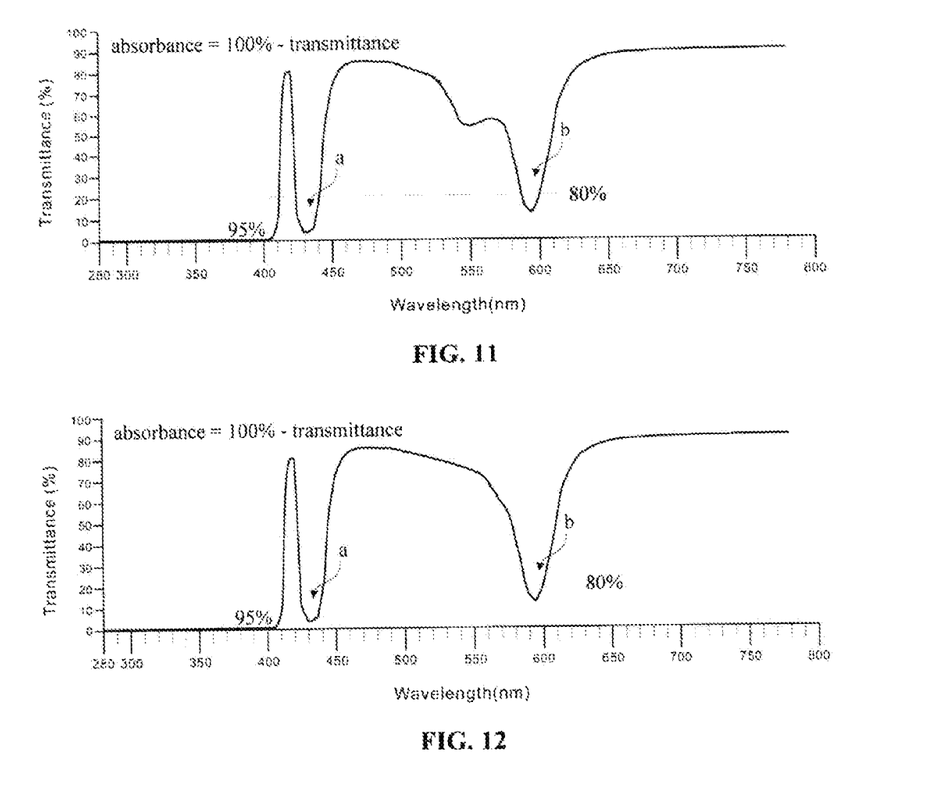
FIG. 11 is a chart illustrating a ninth filtered spectral band of the anti-blue-ray UV optical lens device in accordance with another preferred embodiment of the present invention.
FIG. 12 is a chart illustrating a tenth filtered spectral band of the anti-blue-ray UV optical lens device in accordance with another preferred embodiment of the present invention.

FIG. 11 shows a chart illustrating a ninth filtered spectral band of the anti-blue-ray UV optical lens device in accordance with another preferred embodiment of the present invention. Turning now to FIGS. 1, 2 and 11, by way of example, the ninth filtered spectral band through the optical absorbance portion 2 has a first main absorbance area "a", as best shown at left side in FIG. 11, and a second main absorbance area "b", as best shown at right side in FIG. 11. Furthermore, the first absorbance peak portion of the first main absorbance area "a" has a first absorbance above 95% and the second absorbance peak portion of the second main absorbance area "b" has a second absorbance above 80%.

FIG. 12 shows a chart illustrating a tenth filtered spectral band of the anti-blue-ray UV optical lens device in accordance with another preferred embodiment of the present invention. Turning now to FIGS. 1, 2 and 12, by way of example, the tenth filtered spectral band through the optical absorbance portion 2 has a first main absorbance area "a", as best shown at left side in FIG. 12, and a second main absorbance area "b", as best shown at right side in FIG. 12. Furthermore, the first absorbance peak portion of the first main absorbance area "a" has a first absorbance above 95% and the second absorbance peak portion of the second main absorbance area "b" has a second absorbance above 80%.

Figure 13:
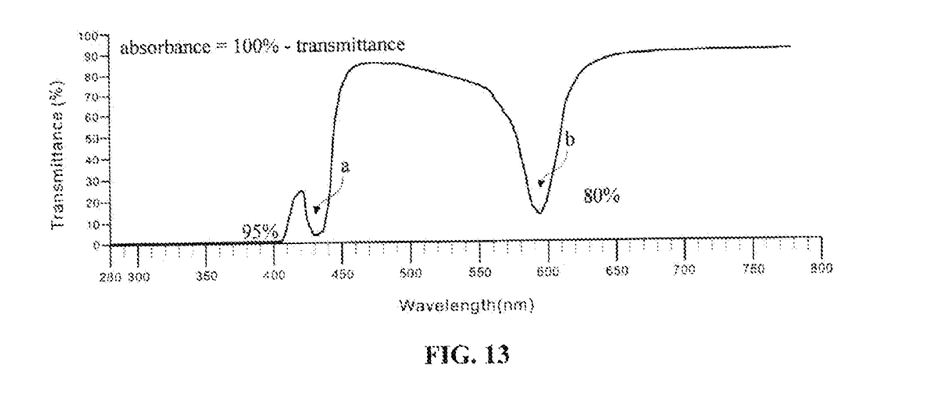
FIG. 13 is a chart illustrating an eleventh filtered spectral band of the anti-blue-ray UV optical lens device in accordance with another preferred embodiment of the present invention.

FIG. 13 shows a chart illustrating an eleventh filtered spectral band of the anti-blue-ray UV optical lens device in accordance with another preferred embodiment of the present invention. Turning now to FIGS. 1, 2 and 13, by way of example, the eleventh filtered spectral band through the optical absorbance portion 2 has a first main absorbance area "a", as best shown at left side in FIG. 13, and a second main absorbance area "b", as best shown at right side in FIG. 13. Furthermore, the first absorbance peak portion of the first main absorbance area "a" has a first absorbance above 95% and the second absorbance peak portion of the second main absorbance area "b" has a second absorbance above 80%.

Figure 14:
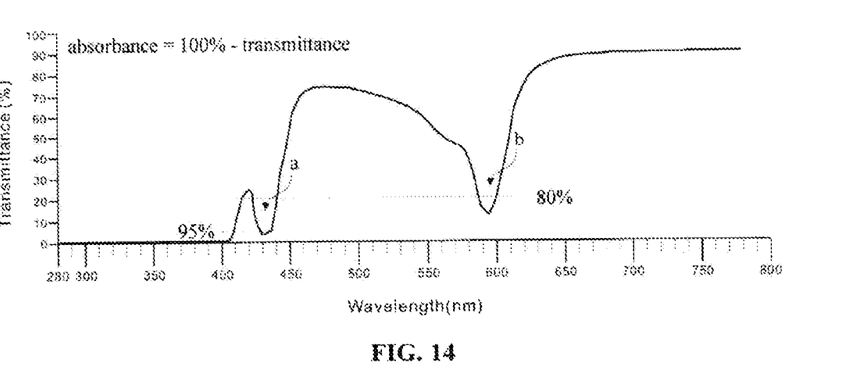
FIG. 14 is a chart illustrating a twelfth filtered spectral band of the anti-blue-ray UV optical lens device in accordance with another preferred embodiment of the present invention.

FIG. 14 shows a chart illustrating a twelfth filtered spectral band of the anti-blue-ray UV optical lens device in accordance with another preferred embodiment of the present invention. Turning now to FIGS. 1, 2 and 14, by way of example, the twelfth filtered spectral band through the optical absorbance portion 2 has a first main absorbance area "a", as best shown at left side in FIG. 14, and a second main absorbance area "b", as best shown at right side in FIG. 14. Furthermore, the first absorbance peak portion of the first main absorbance area "a" has a first absorbance above 95% and the second absorbance peak portion of the second main absorbance area "b" has a second absorbance above 80%.

Figure 15:
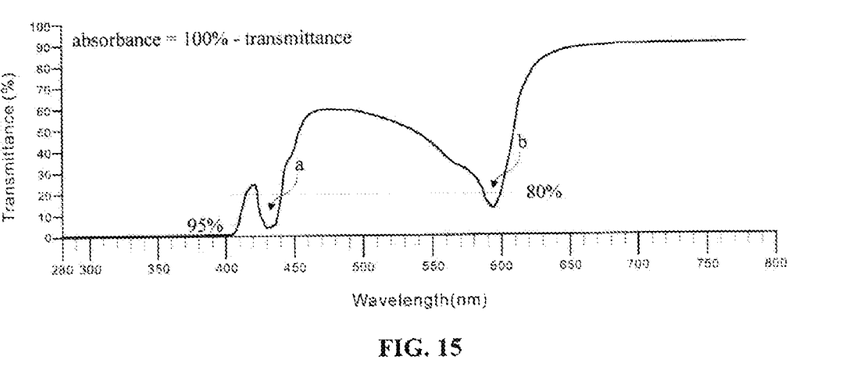
FIG. 15 is a chart illustrating a thirteenth filtered spectral band of the anti-blue-ray UV optical lens device in accordance with a preferred embodiment of the present invention.

FIG. 15 shows a chart illustrating a thirteenth filtered spectral band of the anti-blue-ray UV optical lens device in accordance with another preferred embodiment of the present invention. Turning now to FIGS. 1, 2 and 15, by way of example, the thirteenth filtered spectral band through the optical absorbance portion 2 has a first main absorbance area "a", as best shown at left side in FIG. 15, and a second main absorbance area "b", as best shown at right side in FIG. 15. Furthermore, the first absorbance peak portion of the first main absorbance area "a" has a first absorbance above 95% and the second absorbance peak portion of the second main absorbance area "b" has a second absorbance above 80%.

Figure 16:
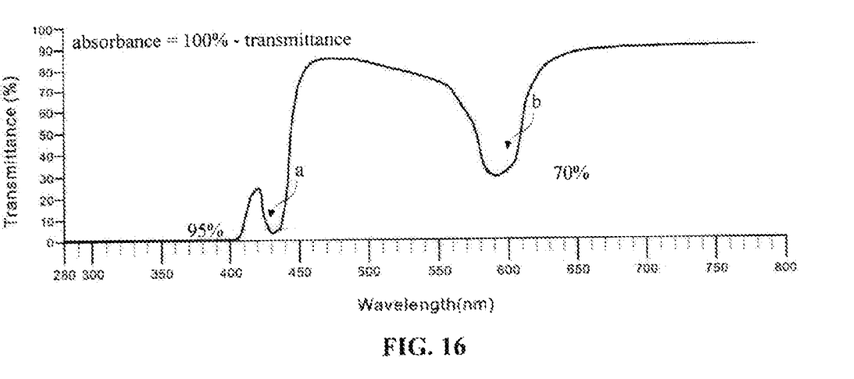
FIG. 16 is a chart illustrating a fourteenth filtered spectral band of the anti-blue-ray UV optical lens device in accordance with another preferred embodiment of the present invention.

FIG. 16 shows a chart illustrating a fourteenth filtered spectral band of the anti-blue-ray UV optical lens device in accordance with another preferred embodiment of the present invention. Turning now to FIGS. 1, 2 and 16, by way of example, the fourteenth filtered spectral band through the optical absorbance portion 2 has a first main absorbance area "a", as best shown at left side in FIG. 16, and a second main absorbance area "b", as best shown at right side in FIG. 16. Furthermore, the first absorbance peak portion of the first main absorbance area "a" has a first absorbance above 95% and the second absorbance peak portion of the second main absorbance area "b" has a second absorbance above 70%.

Figure 17:
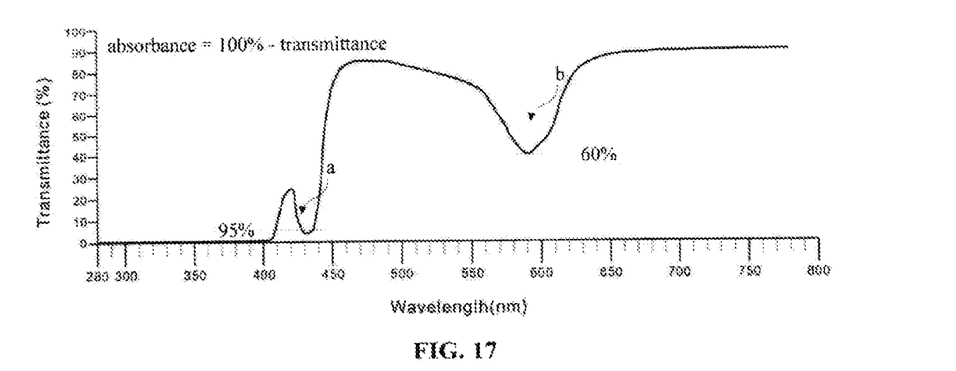
FIG. 17 is a chart illustrating a fifteenth filtered spectral band of the anti-blue-ray UV optical lens device in accordance with another preferred embodiment of the present invention.

FIG. 17 shows a chart illustrating a fifteenth filtered spectral band of the anti-blue-ray UV optical lens device in accordance with another preferred embodiment of the present invention. Turning now to FIGS. 1, 2 and 17, by way of example, the fifteenth filtered spectral band through the optical absorbance portion 2 has a first main absorbance area "a", as best shown at left side in FIG. 17, and a second main absorbance area "b", as best shown at right side in FIG. 17. Furthermore, the first absorbance peak portion of the first main absorbance area "a" has a first absorbance above 95% and the second absorbance peak portion of the second main absorbance area "b" has a second absorbance above 60%.

Figure 18:
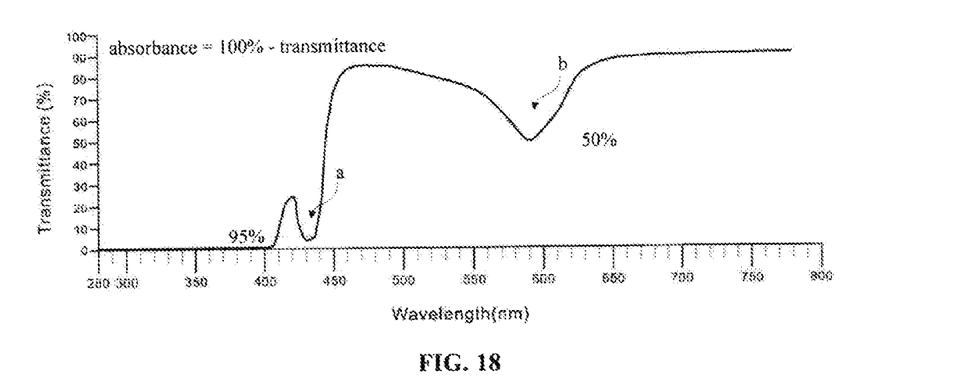
FIG. 18 is a chart illustrating a sixteenth filtered spectral band of the anti-blue-ray UV optical lens device in accordance with another preferred embodiment of the present invention.

FIG. 18 shows a chart illustrating a sixteenth filtered spectral band of the anti-blue-ray UV optical lens device in accordance with another preferred embodiment of the present invention. Turning now to FIGS. 1, 2 and 18, by way of example, the sixteenth filtered spectral band through the optical absorbance portion 2 has a first main absorbance area "a", as best shown at left side in FIG. 18, and a second main absorbance area "b", as best shown at right side in FIG. 18. Furthermore, the first absorbance peak portion of the first main absorbance area "a" has a first absorbance above 95% and the second absorbance peak portion of the second main absorbance area "b" has a second absorbance above 50%.

Figure 19:
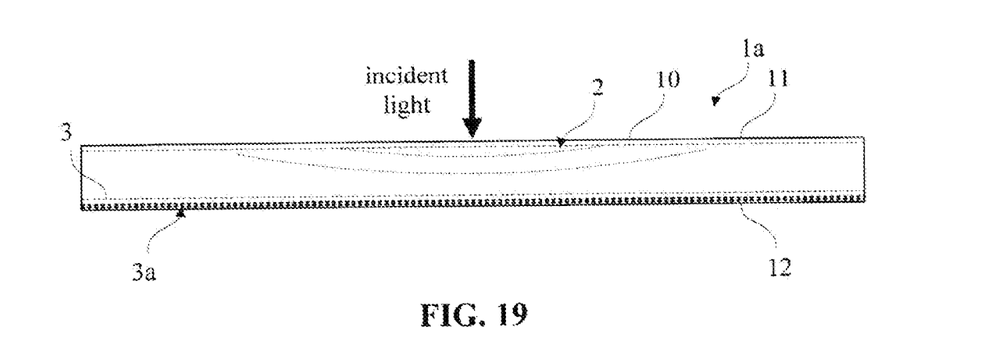
FIG. 19 is a schematic side view of an anti-blue-ray UV optical lens device with chroma enhancement in accordance with a third preferred embodiment of the present invention.

FIG. 19 shows a schematic side view of an anti-blue-ray UV optical lens device with chroma enhancement in accordance with a third preferred embodiment of the present invention. Referring now to FIG. 19, the anti-blue-ray UV optical lens device with chroma enhancement in accordance with the third preferred embodiment of the present invention includes a second lens body 1a, an optical filter 10, an optical absorbance portion 2 and at least one polarization layer 3 formed by polarization films, miniature structures, microstructures or combinations thereof.

With continued reference to FIG. 19, by way of example, the polarization layer 3 may be selectively formed as an integrated layer or a separate layer of the second lens body 1a and provided on one of the first lens surface 11 and the second lens surface 12. In another embodiment, the polarization layers 3 may be provided on the first lens surface 11 and the second lens surface 12.

With continued reference to FIG. 19, by way of example, the polarization layer 3 includes a plurality of surface structures 3a which may be miniature structure patterns or microstructure patterns selectively formed from concave structures, convex structures, grid structures, prism structures or combinations thereof.

Figure 20:
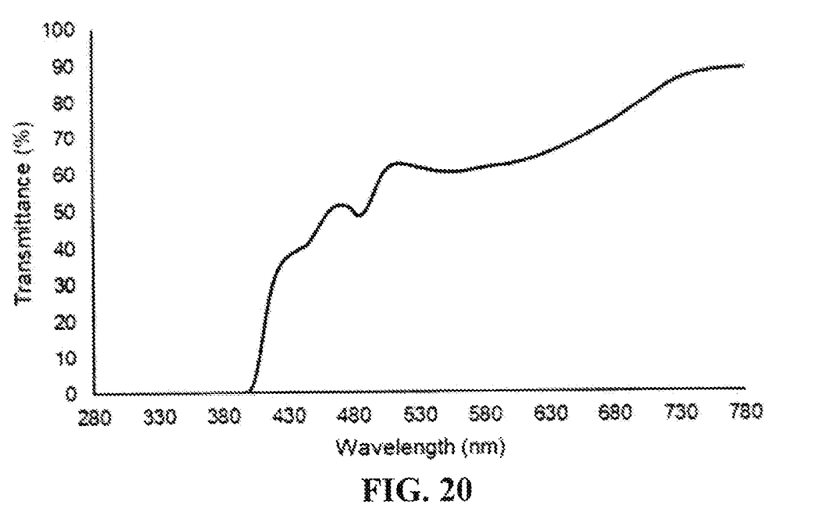
FIG. 20 is a chart illustrating a first polarized and filtered spectral band of the anti-blue-ray UV optical lens device, measured at a light-polarization point of zero-degree angle, in accordance with the third preferred embodiment of the present invention.

FIG. 20 shows a chart illustrating a first polarized and filtered spectral band of the anti-blue-ray UV optical lens device, measured at a light-polarization position of zero-degree angle, in accordance with the third preferred embodiment of the present invention. Turning now to FIGS. 19 and 20, by way of example, the first polarized and filtered spectral band through the optical absorbance portion 2 and the polarization layers 3 is measured at a first light-polarization position of zero-degree angle.

Figure 21:
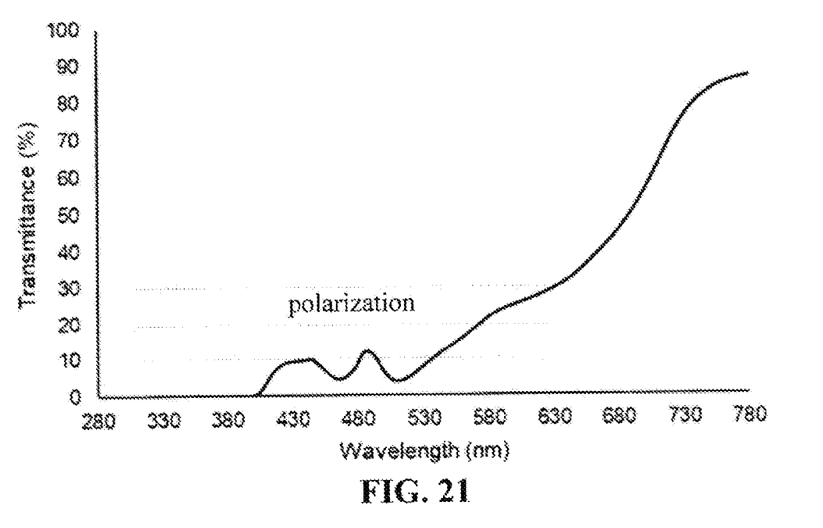
FIG. 21 is a chart illustrating a second polarized and filtered spectral band of the anti-blue-ray UV optical lens device, measured at a light-polarization point of right angle, in accordance with the third preferred embodiment of the present invention.

FIG. 21 shows a chart illustrating a second polarized and filtered spectral band of the anti-blue-ray UV optical lens device, measured at a light-polarization point of right angle, in accordance with the third preferred embodiment of the present invention, corresponding to the chart shown in FIG. 20. Turning now to FIGS. 19 and 21, by way of example, the second polarized and filtered spectral band through the optical absorbance portion 2 and the polarization layers 3 is measured at a second light-polarization position of right angle. The second polarized and filtered spectral band shows a polarized area having a first wavelength ranging between 400 nm and 605 nm, and more effectively between 420 nm and 440 nm or between 425 nm and 435 nm.

Figure 22:
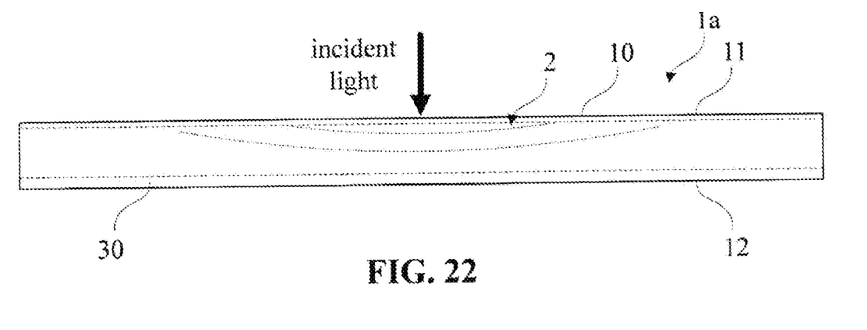
FIG. 22 is a schematic side view of an anti-blue-ray UV optical lens device with chroma enhancement in accordance with a fourth preferred embodiment of the present invention.

FIG. 22 shows a schematic side view of an anti-blue-ray UV optical lens device with chroma enhancement in accordance with a fourth preferred embodiment of the present invention. Referring now to FIG. 22, by way of example, the anti-blue-ray UV optical lens device with chroma enhancement in accordance with the fourth preferred embodiment of the present invention includes a second lens body 1a, an optical filter 10, an optical absorbance portion 2 and at least one photochromic layer 30 made of at least one photochromic material.

With continued reference to FIG. 22, by way of example, the photochromic layer 30 may be selectively formed as an integrated layer or a separate layer of the second lens body 1a and provided on one of the first lens surface 11 and the second lens surface 12. In another embodiment, the photochromic layers 30 may be provided on the first lens surface 11 and the second lens surface 12.

With continued reference to FIG. 22, by way of example, the photochromic layer 30 includes a PU material and a photochromic material. In a preferred embodiment, the PU material is made of PU particles and at least one organic solvent which may be selected from toluene (methylbenzene), xylene, tetrahydrofuran (THF), chloroform and mixtures thereof. In a preferred embodiment, the photochromic material may be selected from photochromic spriooxazines, for example, including:
1,3,3-trimethylindolino-beta-naphthopyrylo spiran,
1,3,3-trimethylindolino-6'-bromobenzopyrylospiran,
1,3,3-trimethylindolino-6'-nitrobenzopyrylospiran, and
similar chemical structure compounds thereof.

Figure 23:
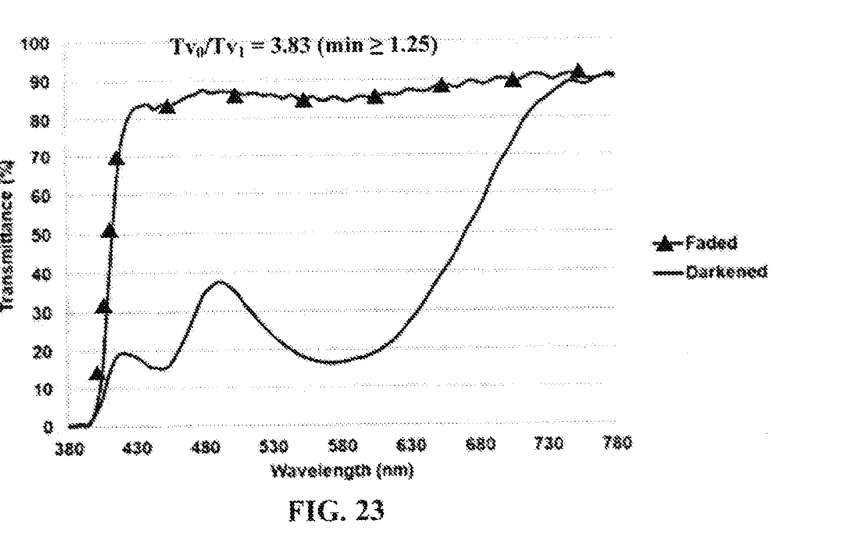
FIG. 23 is a chart illustrating two filtered spectral bands of the anti-blue-ray UV optical lens device having a photochromic layer, measured at faded and darkened states, in accordance with the third preferred embodiment of the present invention.

FIG. 23 shows a chart illustrating two filtered spectral bands of the anti-blue-ray UV optical lens device having a photochromic layer, measured at faded and darkened states, in accordance with the third preferred embodiment of the present invention. Referring now to FIG. 23, by way of example, a first filtered spectral band (shown at black triangle symbols) and its transmittance ($Tv_0$) are measured at a faded state of the photochromic layer 30 while a second filtered spectral band and its transmittance ($Tv_1$) are measured at a darkened state of the photochromic layer 30, having a ratio ($Tv_0/Tv_1$) about 3.83 (min≥1.25) which is obviously much higher than a standard value.

Figure 24:
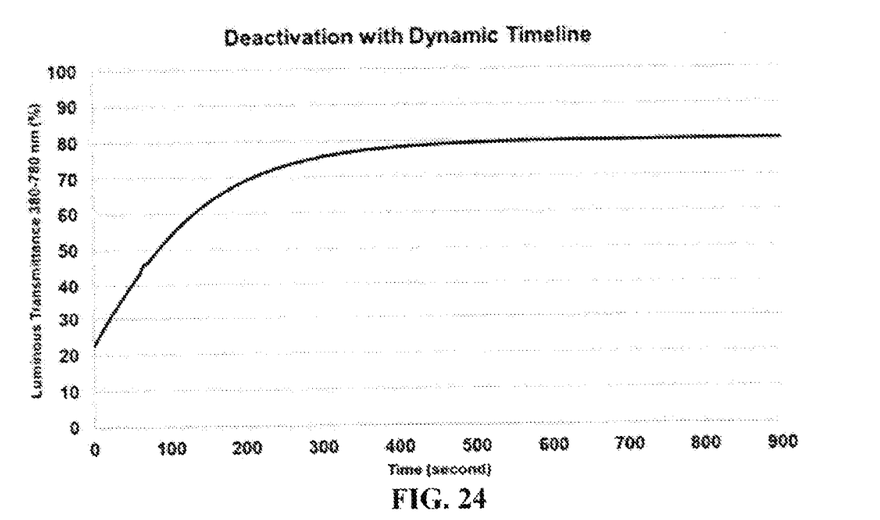
FIG. 24 is a chart illustrating deactivation of the anti-blue-ray UV optical lens device having a photochromic layer in accordance with the third preferred embodiment of the present invention.

FIG. 24 shows a chart illustrating deactivation of the anti-blue-ray UV optical lens device having a photochromic layer in accordance with the third preferred embodiment of the present invention. Referring now to FIGS. 19 and 24, by way of example, a series of luminous transmittance percentage of the second lens body 1a provided with the optical absorbance portion 2 and the photochromic layer 30 is measured at between 380 nm and 780 nm. A maximum luminous transmittance of the second lens body 1a is about 22% and a minimum luminous transmittance of deactivation of the second lens body 1a reaches about 80%.

Although the invention has been described in detail with reference to its presently preferred embodiment, it will be understood by one of ordinary skills in the art that various modifications can be made without departing from the spirit and the scope of the invention, as set forth in the appended claims.

What is claimed is:

1. An anti-blue-ray UV optical lens device comprising:
a lens body having a first lens surface and a second lens surface, with the first lens surface provided at a first side of the lens body, with the second lens surface provided at a second side of the lens body;
an optical filter provided between the first side and the second side of the lens body; and
an optical absorbance portion provided in the optical filter, with the optical absorbance portion having a main absorbance area with an absorbance peak portion;
wherein the main absorbance area has a first wavelength range between 420 nm and 440 nm formed as a high-energy blue UV absorbance area, with said main absorbance area having a maximum main absorbance with a wavelength at 432 nm.

2. The anti-blue-ray UV optical lens device as defined in claim 1, wherein the absorbance peak portion of the main absorbance area has a spectral range with an absorbance above 50%, 60%, 70%, 80% or 95%.

3. The anti-blue-ray UV optical lens device as defined in claim 1, wherein the at least one absorbance peak portion of the main absorbance area has an included angle.

4. The anti-blue-ray UV optical lens device as defined in claim 3, wherein the included angle is about 60°.

5. The anti-blue-ray UV optical lens device as defined in claim 1, wherein the main absorbance area is formed from a dye powder material.

6. The anti-blue-ray UV optical lens device as defined in claim 1, wherein the absorbance peak portion of the main absorbance area ranges at the maximum absorbance of 432 nm.

7. The anti-blue-ray UV optical lens device as defined in claim 1, wherein the main absorbance area is corresponding with another main absorbance area.

8. The anti-blue-ray UV optical lens device as defined in claim 1, wherein the absorbance peak portion of the main absorbance area ranges between 420 nm and 440 nm or any suitable range within 420 nm and 440 nm.

9. The anti-blue-ray UV optical lens device as defined in claim 1, wherein the lens body further includes a polarization layer provided on the first lens surface or the second lens surface, with the polarization layer providing a polarized area having a wavelength ranging between 425 nm and 435 nm.

10. The anti-blue-ray UV optical lens device as defined in claim 1, wherein the lens body further includes a photochromic layer provided on the first lens surface or the second lens surface, with the photochromic layer having a PU particle material and a photochromic material.

11. An anti-blue-ray UV optical lens device comprising:
a lens body having a first lens surface and a second lens surface, with the first lens surface provided at a first side of the lens body, with the second lens surface provided at a second side of the lens body;
an optical filter provided between the first side and the second side of the lens body; and
an optical absorbance portion provided in the optical filter, with the optical absorbance portion having a main absorbance area with an absorbance peak portion;
wherein the main absorbance area has a second wavelength range between 425 nm and 435 nm formed as a high-energy blue UV absorbance area, with said main absorbance area having a maximum main absorbance with a wavelength at 432 nm.

12. The anti-blue-ray UV optical lens device as defined in claim 11, wherein the absorbance peak portion of the main absorbance area has a spectral range with an absorbance above 50%, 60%, 70%, 80% or 95%.

13. The anti-blue-ray UV optical lens device as defined in claim 11, wherein the at least one absorbance peak portion of the main absorbance area has an included angle.

14. The anti-blue-ray UV optical lens device as defined in claim 13, wherein the included angle is about 60°.

15. The anti-blue-ray UV optical lens device as defined in claim 11, wherein the main absorbance area is formed from a dye powder material.

16. The anti-blue-ray UV optical lens device as defined in claim 11, wherein the absorbance peak portion of the main absorbance area ranges at the maximum absorbance of 432 nm.

17. The anti-blue-ray UV optical lens device as defined in claim 11, wherein the main absorbance area is corresponding with another main absorbance area.

18. The anti-blue-ray UV optical lens device as defined in claim 11, wherein the absorbance peak portion of the main absorbance area ranges between 425 nm and 435 nm or any suitable range within 425 nm and 435 nm.

19. The anti-blue-ray UV optical lens device as defined in claim 11, wherein the lens body further includes a polarization layer provided on the first lens surface or the second lens surface, with the polarization layer providing a polarized area having a wavelength ranging between 425 nm and 435 nm.

20. The anti-blue-ray UV optical lens device as defined in claim 11, wherein the lens body further includes a photochromic layer provided on the first lens surface or the second lens surface, with the photochromic layer having a PU particle material and a photochromic material.

* * * * *